(12) United States Patent
Hanson et al.

(10) Patent No.: US 8,532,207 B2
(45) Date of Patent: Sep. 10, 2013

(54) METHODS AND SYSTEMS FOR DISTINGUISHING A SIGNAL OF INTEREST FROM INTERFERENCE SIGNALS

(75) Inventors: Colin S. Hanson, Minneapolis, MN (US); Benjamin J. Winstead, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 251 days.

(21) Appl. No.: 13/117,407

(22) Filed: May 27, 2011

(65) Prior Publication Data

US 2012/0300822 A1    Nov. 29, 2012

(51) Int. Cl.
*H04K 1/10*     (2006.01)
*H04L 27/28*    (2006.01)

(52) U.S. Cl.
USPC ........... 375/260; 375/340; 375/259; 375/224; 375/228; 375/316; 455/67.11; 455/226.1; 455/226.2; 702/75; 702/76; 702/77

(58) Field of Classification Search
USPC ................. 375/340, 260, 316, 259, 224, 228; 455/67.11, 206.1, 206.2, 226.1, 226.2; 702/75–77
See application file for complete search history.

(56) References Cited

U.S. PATENT DOCUMENTS

| | | |
|---|---|---|
| 4,106,018 A | 8/1978 | Chihak et al. |
| 4,739,518 A | 4/1988 | Bickley et al. |
| 5,387,917 A | 2/1995 | Hager |
| 5,475,869 A | 12/1995 | Gomi et al. |
| 6,407,697 B1 | 6/2002 | Hager et al. |
| 6,654,471 B1 | 11/2003 | Varga |
| 6,847,689 B1 | 1/2005 | Vuorinen et al. |
| 6,903,685 B1 | 6/2005 | Arndt et al. |
| 7,171,161 B2 * | 1/2007 | Miller ........................ 455/67.11 |
| 7,187,321 B2 | 3/2007 | Watanabe et al. |
| 7,714,774 B2 | 5/2010 | Winstead |
| 2004/0130482 A1 | 7/2004 | Lin et al. |
| 2007/0030931 A1 | 2/2007 | Arambepola |
| 2009/0221256 A1 | 9/2009 | Sahinoglu et al. |
| 2009/0310712 A1 * | 12/2009 | Nakatani ........................ 375/316 |

FOREIGN PATENT DOCUMENTS

| | | |
|---|---|---|
| DE | 3105140 | 9/1982 |
| GB | 1144109 | 3/1969 |

* cited by examiner

*Primary Examiner* — Phuong Phu
(74) *Attorney, Agent, or Firm* — Fogg & Powers LLC

(57) ABSTRACT

A method for distinguishing a signal of interest from one or more interference signals in a received analog signal comprises receiving an analog signal at a radio front end, and transmitting the received analog signal to an analog-to-digital converter to sample data in the received analog signal and output a digital signal. A sub-channel Fast Fourier Transform (FFT) is performed on the digital signal, and sub-channel FFT bin magnitudes are averaged over a set period of time to determine a shape of the received signal. The shape of the received signal is compared to one or more signal reference patterns by computing a metric for the shape of the received signal, and computing a metric for the one more signal reference patterns. The computed metrics are then compared to a predetermined threshold value to determine the presence, or lack thereof, of a signal of interest in the received signal.

18 Claims, 4 Drawing Sheets

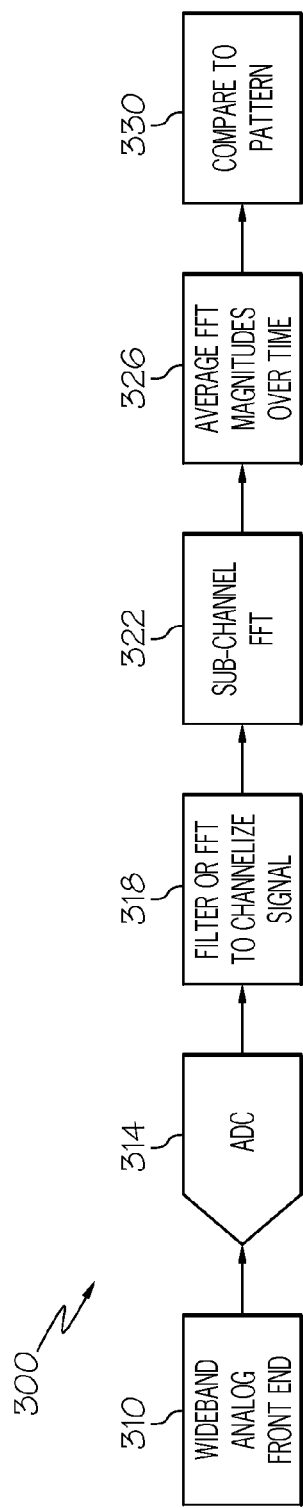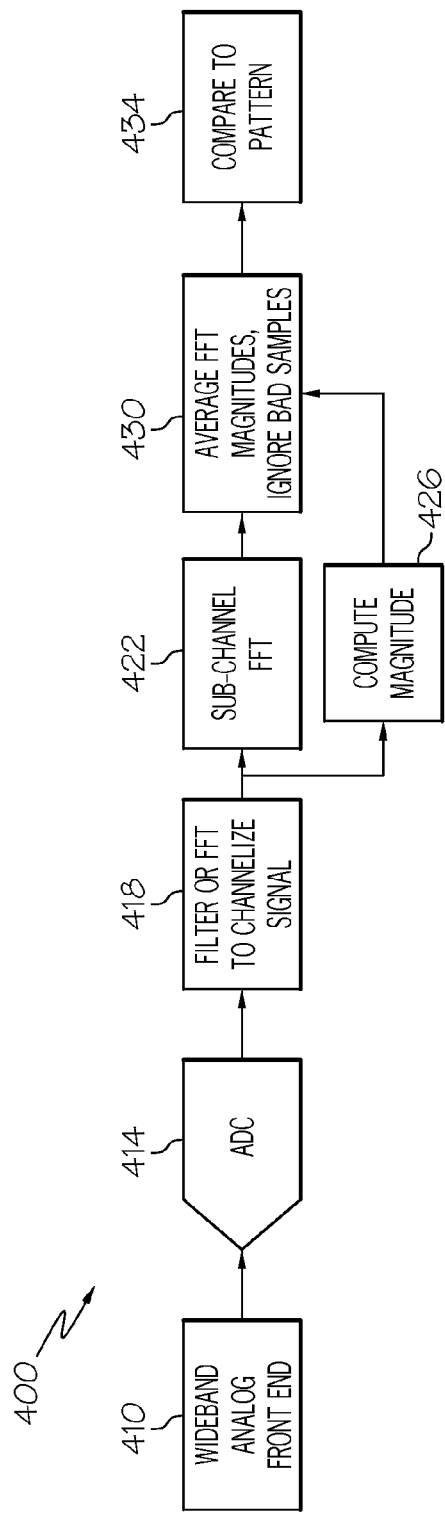

ary approach for distinguishing a signal of interest from interference signals;

FIG. 3 is a process flow diagram of another approach for distinguishing a signal of interest from interference signals;

FIG. 4 is a process flow diagram of another alternative approach for distinguishing a signal of interest from interference signals;

DETAILED DESCRIPTION

Figure 1:
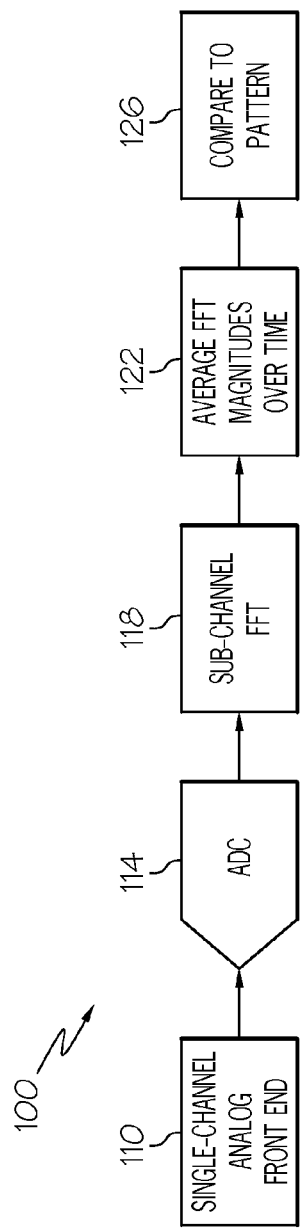

In the following detailed description, reference is made to the accompanying drawings in which is shown by way of example specific illustrative embodiments. It is to be understood that other embodiments may be utilized and that mechanical and electrical changes may be made. The following detailed description is, therefore, not to be taken in a limiting sense.

Methods and systems are disclosed for distinguishing a signal of interest from interference signals such that a particular signal can be detected in the presence of interfering signals that are not of the same modulation type. The present approach utilizes a pattern matching algorithm that can detect the presence of a signal of a particular modulation type within a predefined channel defined by a center frequency and bandwidth. The predefined channel has a sufficient bandwidth such that by comparison, a continuous wave (CW) signal would occupy only a small portion of the defined bandwidth over the time of a measurement period.

The signal of interest is expected to be present for a substantial amount of time such that the collection of samples can be taken and broken up into a series of data blocks. A Fast Fourier Transform (FFT) of sufficient resolution can be performed to provide multiple FFT bins per channel for each data block. This can be performed by using an M-Point FFT, where M is a variable representing the number of data points that provide sufficient resolution to provide multiple FFT bins per channel for a data block.

Due to the expected modulation scheme and the sequence of data that the modulated signal represents, the spectral content will change significantly from block to block. However, by averaging the FFT bin magnitudes over time, the spectral content will exhibit a set of patterns that can be characterized. By training the present system to recognize "typical" patterns that would suggest the presence of a signal of interest, the system can ignore signals such as CW, wide-band noise, and the like.

The present approach can also be optimized for detection of constant envelope signals, such as minimum-shift keying (MSK) type signals. In this case, a running average of signal level can be calculated based on the levels of the FFT bin outputs. If a given sample is above the running average by a set amount, this can be flagged by the system as a corrupted time period. The FFT data associated with the channel for that period of time is then not used in the subsequent pattern estimation because it would potentially result in an invalid pattern, giving a false negative indication of signal presence.

In an alternative approach, the number of rejected samples is counted. If the number of rejected samples reaches a certain amount, the pattern matching algorithm of the present approach is not performed. Optionally, this count can be used to assign a confidence factor to the estimation of presence of signal.

Alternatively, the channel rejection can be applied to the signal that has been filtered down to one channel before the FFT occurs. Then, a smaller FFT is performed across that single channel to provide the higher resolution bins. Optionally, the filtering down to a single channel can occur in the analog domain before digitization (sampling).

As another option, the magnitude for the individual channel can be computed by summing the magnitudes of each of the bins within the channel. This can then be used in a subsequent pulsed-interference detection approach, which is described further hereafter.

FIG. 1 is a flow diagram of a method 100 for distinguishing a signal of interest from interference signals according to one approach. Initially, an analog signal is received at a front end 110 of a radio, such as a single-channel analog front end, which transmits the received signal to an analog-to-digital converter (ADC) 114 to sample data in the signal. A sub-channel FFT is then performed on the digitized signal from the ADC at 118. The sub-channel FFT bin magnitudes are then averaged or summed over a set period of time at 122 to determine a shape of the received signal. This period of time is chosen to represent the duration of time expected for the signal to be present. The shape of the received signal is then compared to one or more signal reference patterns at 126, to determine which reference pattern is the best match to the shape of the received signal. This is done by generating a metric for each pattern shape that represents the "goodness" of the fit between the individual pattern shapes and the received signal. The metrics are compared to a threshold value to provide a positive or negative indication of shape match.

The front end 110 can be a typical radio frequency (RF) receiver that converts a signal from an RF frequency to a lower frequency and bandwidth suitable for ADC 114 to sample the data. When the FFT is performed on the sampled data, each bin of the FFT provides In-phase (I) and Quadrature-phase (Q) values, which are used to compute the magnitude of the bin. The bin magnitude can be considered to be either $I^2+Q^2$ or the square root of $(I^2+Q^2)$. The FFT size is chosen such that there are multiple FFT bins to cover the entire bandwidth of the signal of interest. This can be done by using an M-Point FFT. The chosen number of bins used to cover the channel bandwidth depends on a number of factors including, but not limited to, processing resources, digital storage requirements, and pattern-matching performance for the given signal modulation. A typical value may be seven bins to cover the span of the channel, in which case an 8-point FFT would typically be used and the system would process the seven bins most useful in representing the signal.

The number of signal reference patterns that are used for comparison depends on the variations that are found in valid signals. The reference patterns can be collected experimentally by observing all or a significant selection of possible transmitted signals of interest. For example, a set of five (5) patterns that are representative of typical signals can be used. One pattern is considered a set of values equal in quantity to the number of FFT bins required to cover the bandwidth of the signal of interest.

The pattern values are normalized, and any set of input values are also normalized to be able to compare those values to those of the patterns. After normalization, the shape of the received signal is then compared to one or more (or all) of the reference patterns to see which reference pattern is the best match to the shape of the received signal. The comparison process is discussed in further detail hereafter with respect to FIG. 6. The final output of the comparison process is an indication of the presence in the received signal, or lack thereof, of a signal with the modulation type of interest.

Figure 2:
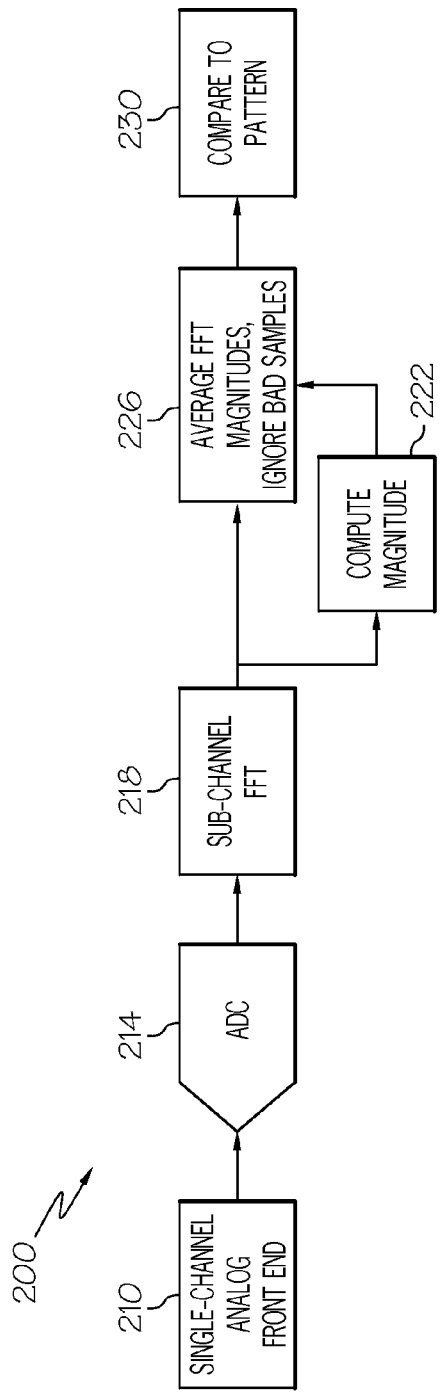

FIG. 2 is a flow diagram of an alternative method 200 for distinguishing a signal of interest from interference signals. The method 200 has some of the same steps as method 100, which operate in the manner described above. Accordingly, an analog signal is received at a single-channel analog front end 210, which transmits the received signal to an ADC 214 to sample data in the signal. A sub-channel FFT is then performed on the digitized signal from the ADC at 218. At this point, sub-channel FFT bin magnitudes are computed at 222 by summing the magnitudes of each of the bins within the channel. The FFT bin magnitudes are then averaged over time, with bad samples ignored at 226. The shape of the received signal is then compared to one or more signal reference patterns at 230, to determine which reference pattern is the best match to the shape of the received signal. This comparison process is discussed in further detail hereafter with respect to FIG. 6. The final output of the comparison process is an indication of the presence, or lack thereof, of a signal with the modulation type of interest.

FIG. 3 is a flow diagram of a method 300 for distinguishing a signal of interest from interference signals according to another approach, which processes wideband signals. A wideband signal can contain more than one signal of interest (channel). The wideband signal can contain, for example, more than one periodically spaced channels or aperiodic spaced channels.

Initially, an analog signal is received at a wideband analog front end 310, which transmits the received signal to an ADC 314 to sample data in the signal. A FFT (or filtering) is performed on the sampled data to channelize the signal at 318. A sub-channel FFT is then performed on the signal at 322. The FFT bin magnitudes are then averaged over a designated period of time at 326. The shape of the received signal is then compared to one or more reference patterns at 330, to determine which reference pattern is the best match to the shape of the received signal. Again, this comparison process is discussed in further detail hereafter with respect to FIG. 6. The final output of the comparison process is an indication of the presence, or lack thereof, of a signal with the modulation type of interest.

FIG. 4 is a flow diagram of an alternative method 400 for distinguishing a signal of interest from interference signals, which processes wideband signals. A signal is received at a wideband analog front end 410, which transmits the signal to an ADC 414 to sample data in the signal. A FFT (or filtering) is performed on the sampled data to channelize the signal at 418. A sub-channel FFT is then performed on the channelized signal at 422, and the FFT bin magnitude of the channelized signal is computed at 426. The FFT bin magnitudes are then averaged, with bad samples ignored at 430. The shape of the received signal is then compared to one or more reference patterns at 434, to determine which reference pattern is the best match to the shape of the received signal. Once again, this comparison process is discussed in further detail hereafter with respect to FIG. 6. The final output of the comparison process is an indication of the presence, or lack thereof, of a signal with the modulation type of interest.

Figure 5:
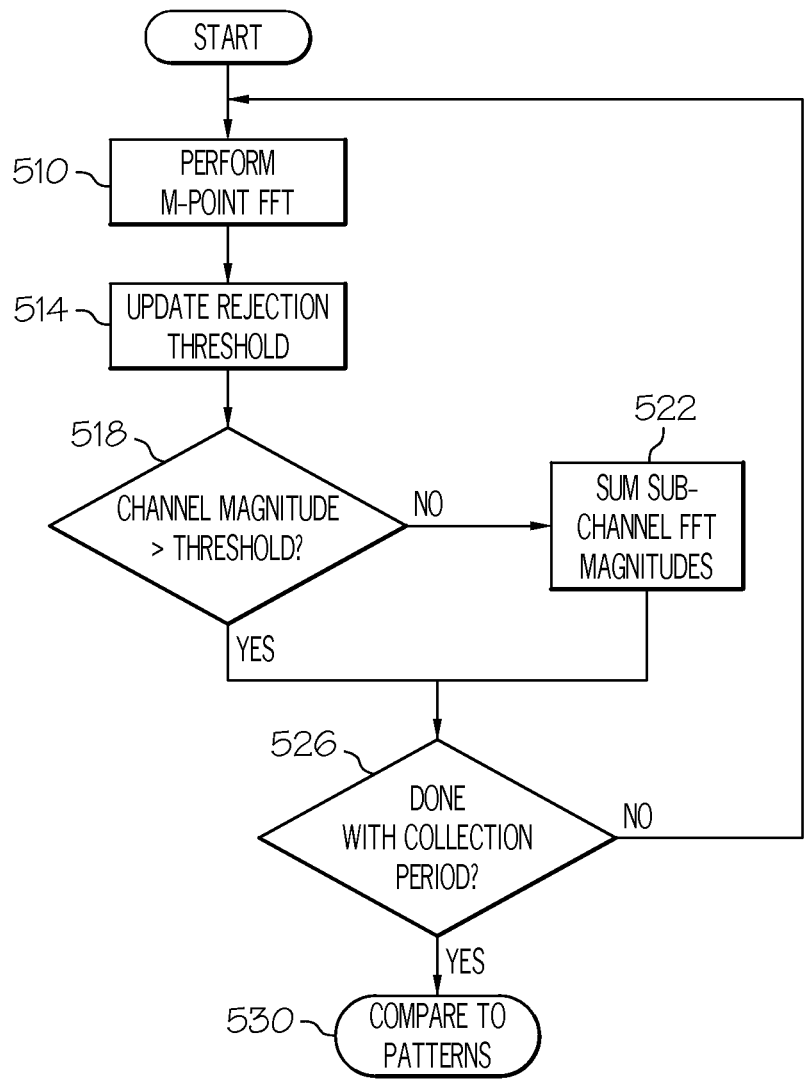
FIG. 5 is a process flow diagram showing further details of one of the process steps in FIGS. 2 and 4.

FIG. 5 is a flow diagram showing further details of the process steps in FIGS. 2 and 4 of averaging FFT magnitudes and ignoring bad samples. At the start, an M-point FFT is performed at 510, and a rejection threshold is then updated at 514. A determination is then made whether the channel magnitude is greater than a threshold at 518. If not, the sub-channel FFT magnitudes are then summed at 522 by adding the current sub-channel FFT bin magnitudes to a sum of past sub-channel FFT bin magnitudes for the current sample collection period. A determination is then made whether the sample collection period is done at 526. If not, the process returns to step 510 and is repeated. If the sample collection period is done, the pattern comparison step is carried out at 530, which is discussed in further detail with respect to FIG. 6 hereafter. Returning to step 518, if the channel magnitude is greater than the threshold, then the process goes directly to step 526 to determine whether the sample collection period is complete. If not, the process returns to step 510 and is repeated. If the sample collection period is done, the pattern comparison step is carried out at 530.

Figure 6:
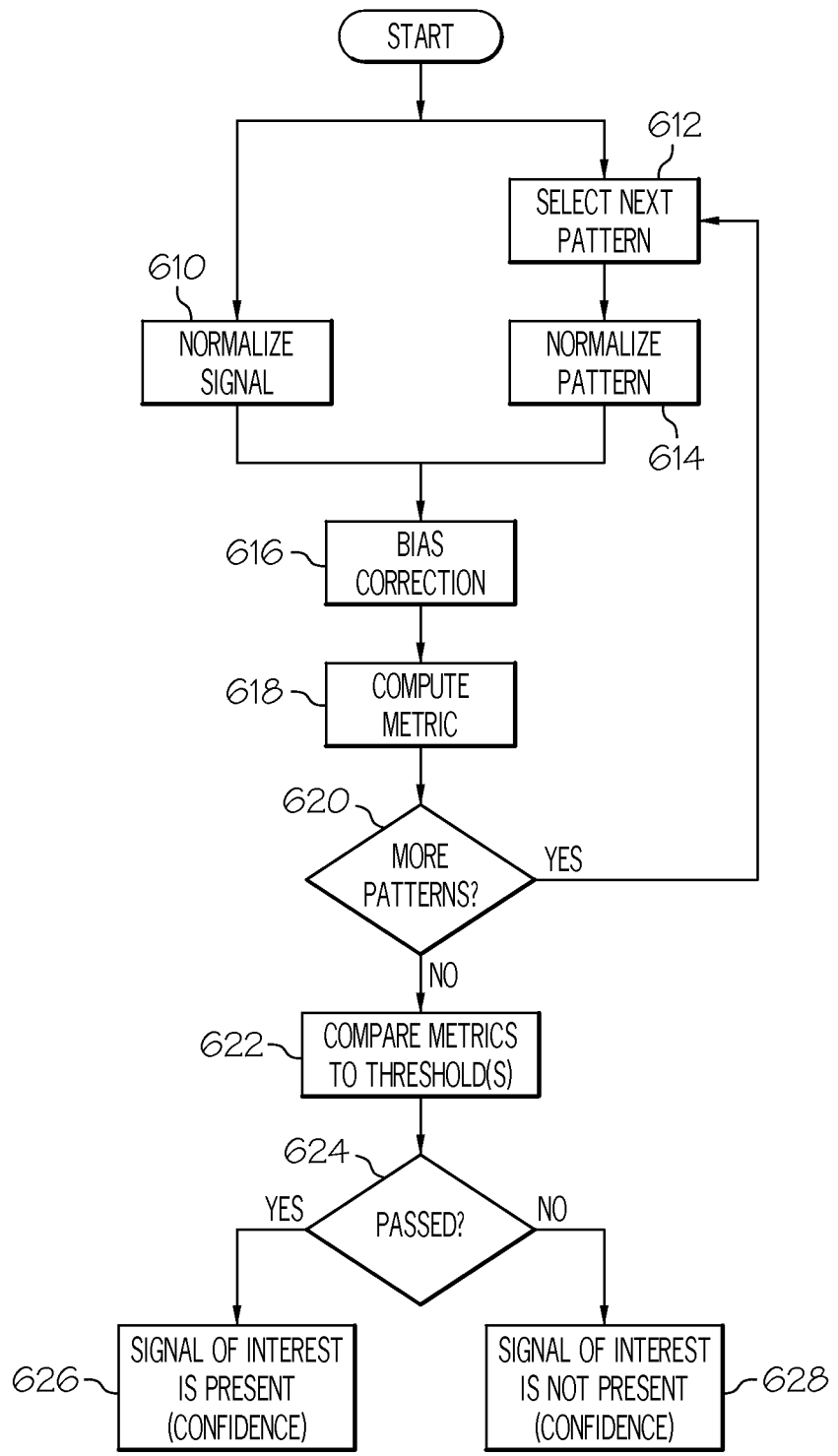
FIG. 6 is a process flow diagram showing further details of one of the process steps in FIGS. 1-4.

FIG. 6 is a process flow diagram showing further details of the pattern comparison step in FIGS. 1-4. The "signal" in FIG. 6 refers to the output signal of blocks 122, 226, 326 and 430 from FIGS. 1, 2, 3 and 4, respectively. As depicted in FIG. 6, after the process is started the signal is normalized at 610, the next reference pattern is selected at 612, and the reference pattern is normalized at 614. Once both the signal and selected reference pattern have been normalized, a bias correction factor is computed and applied at 616. The bias can be computed in a number of ways, such as by adjusting the normalized signal or normalized reference pattern by the difference between the mean of the normalized signal and the mean of the normalized reference pattern. A metric is then computed at 618 for use in comparing the shape of the signal with the shape of the reference pattern. There are multiple conventional ways to compute the metric of how well the received signal shape matches a reference pattern. One example is to sum the squares of the differences between the reference pattern points and the received signal shape points.

A determination is then made at 620 whether more patterns are available for comparison. If more patterns are available, the next pattern is selected at 612 and the foregoing process is repeated until a metric has been computed for each reference pattern. When there are no more reference patterns, the computed metrics are compared to threshold values at 622 and a confidence factor is assigned to the quality of the match between the signal and the reference patterns. Depending on the choice of metric computation, a good match might be suggested by a metric value above a threshold or below a threshold. A determination is then made at 624 whether a computed metric has passed the threshold requirement. If passed, an indication is made at 626 that a signal of interest is present within the output signal of blocks 122, 226, 326 and 430. If the threshold requirement is not passed, an indication is made at 628 that the signal of interest is not present within the output signal. Additionally, this yes/no decision can have an associated confidence value to indicate the certainty of the decision.

The present methods may be susceptible to certain types of non-Gaussian noise (i.e., colored noise, not white noise). One type of interference is pulsed interference, which can have a negative effect. In severe cases, this type of interference will present itself as a large increase in signal level in the channel of interest over a span of time that is short relative to the entire duration of the filtering/decision period. One method of reducing the effects of pulsed interference is to place a pulsed-interference rejection filter in the signal receive chain of the system. For example, this filter can be applied at the front of a processing section to detect when a large increase in signal level is present for only a short period of time. Optionally, a similar desirable response can be realized by implementing the filtering scheme described in U.S. Pat. No. 7,714,774, entitled FALSE LOCK FILTER FOR PULSED RADAR ALTIMETERS, the disclosure of which is incorporated by reference herein.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, Blu-ray discs, or other optical storage disks; nonvolatile ROM, RAM, and other like media; or any other media that can be used to carry or store desired program code in the form of computer executable instructions or data structures.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. A method for distinguishing a signal of interest from one or more interference signals in a received analog signal, the method comprising:
   receiving an analog signal at a radio front end;
   transmitting the received analog signal to an analog-to-digital converter to sample data in the received analog signal and output a digital signal;
   performing a sub-channel fast Fourier transform (FFT) on the digital signal;
   averaging sub-channel FFT bin magnitudes over a set period of time to determine a shape of the received signal; and
   comparing the shape of the received signal to one or more signal reference patterns by a method comprising:
   (a) normalizing the shape of the received signal;
   (b) selecting a next signal reference pattern;
   (c) normalizing the next signal reference pattern;
   (d) computing a bias correction factor for the normalized received signal and the normalized signal reference pattern;
   (e) computing a metric for comparing the shape of the normalized received signal with the normalized signal reference pattern;
   (f) determining whether one or more different signal reference patterns are available;
   (g) if one or more different signal reference patterns are available, repeating (b) to (f) until a metric has been computed for each of the signal reference patterns; and
   (h) determining whether each computed metric has passed a threshold requirement indicating that a signal of interest is present in the received signal.

2. The method of claim 1, wherein the radio front end is a single-channel analog front end.

3. The method of claim 2, wherein averaging the sub-channel FFT bin magnitudes comprises computing sub-channel FFT bin magnitudes by summing the magnitudes of the bins within a channel.

4. The method of claim 2, wherein averaging the sub-channel FFT bin magnitudes comprises:
   (a) performing an M-point FFT, where M is a variable representing the number of data points that provide sufficient resolution to provide multiple FFT bins per channel for a data block;
   (b) updating a rejection threshold;
   (c) determining whether a channel magnitude is greater than the threshold;
   (d) if the channel magnitude is not greater than the threshold, adding current sub-channel FFT bin magnitudes to a sum of past sub-channel FFT bin magnitudes for a current sample collection period and determining whether the sample collection period is complete;
   (e) if the channel magnitude is greater than the threshold, determining whether the current sample collection period is complete; and
   (f) repeating (a) to (e) if the sample collection period is not complete.

5. The method of claim 1, wherein the front end is a wideband analog front end.

6. The method of claim 5, wherein prior to performing a sub-channel FFT on the digital signal, an FFT or filtering is performed on the sampled data to channelize the signal.

7. The method of claim 6, wherein the sub-channel FFT is performed on the channelized signal, and a magnitude of the channelized signal is computed.

8. The method of claim 7, wherein averaging the sub-channel FFT bin magnitudes comprises:
   (a) performing an M-point FFT, where M is a variable representing the number of data points that provide sufficient resolution to provide multiple FFT bins per channel for a data block;
   (b) updating a rejection threshold;
   (c) determining whether a channel magnitude is greater than the threshold;
   (d) if the channel magnitude is not greater than the threshold, adding current sub-channel FFT bin magnitudes to a sum of past sub-channel FFT bin magnitudes for a current sample collection period and determining whether the sample collection period is complete;
   (e) if the channel magnitude is greater than the threshold, determining whether the current sample collection period is complete; and
   (f) repeating (a) to (e) if the sample collection period is not complete.

9. A computer program product, comprising:
   a non-transitory computer readable medium having instructions stored thereon executable by a processor to perform a method for distinguishing a signal of interest from one or more interference signals, the method comprising:
      receiving an analog signal at a radio front end configured to receive a single channel or multiple channels;
      transmitting the received analog signal to an analog-to-digital converter to sample data in the received analog signal and output a digital signal;
      performing a sub-channel fast Fourier transform (FFT) on the digital signal;
      averaging sub-channel FFT bin magnitudes over a set period of time to determine a shape of the received signal, wherein averaging the sub-channel FFT bin magnitudes comprises:
         (a) performing an M-point FFT, where M is a variable representing the number of data points that provide sufficient resolution to provide multiple FFT bins per channel for a data block;
         (b) updating a rejection threshold;
         (c) determining whether a channel magnitude is greater than the threshold;
         (d) if the channel magnitude is not greater than the threshold, adding current sub-channel FFT bin magnitudes to a sum of past sub-channel FFT bin magnitudes for a current sample collection period and determining whether the sample collection period is complete;
         (e) if the channel magnitude is greater than the threshold, determining whether the current sample collection period is complete; and
         (f) repeating (a) to (e) if the sample collection period is not complete; and
      comparing the shape of the received signal to one or more signal reference patterns.

10. The computer program product of claim 9, wherein the radio front end is configured to receive a single channel.

11. The computer program product of claim 9, wherein comparing the shape of the received signal to one or more signal reference patterns comprises:
    (a) normalizing the shape of the received signal;
    (b) selecting a next signal reference pattern;
    (c) normalizing the next signal reference pattern;
    (d) computing a bias correction factor for the normalized received signal and the normalized signal reference pattern;
    (e) computing a metric for comparing the shape of the normalized received signal with the normalized signal reference pattern;
    (f) determining whether one or more different signal reference patterns are available;
    (g) if one or more different signal reference patterns are available, repeating (b) to (f) until a metric has been computed for each of the signal reference patterns; and
    (h) determining whether each computed metric has passed a threshold requirement indicating that a signal of interest is present in the received signal.

12. The computer program product of claim 9, wherein when the radio front end is configured to receive multiple channels, prior to performing a sub-channel FFT on the digital signal, an FFT or filtering is performed on the sampled data to channelize the signal.

13. The computer program product of claim 12, wherein the sub-channel FFT is performed on the channelized signal, and a magnitude of the channelized signal is computed.

14. A system for distinguishing a signal of interest from one or more interference signals, the system comprising:
    a radio front end configured to receive a single channel or multiple channels;
    an analog-to-digital converter operatively coupled to the radio front end to receive a signal from the radio front end, the analog-to-digital converter configured to sample data in the received signal and produce a digital signal;
    at least one processor operatively coupled to the analog-to-digital converter to receive the digital signal; and
    at least one computer readable medium operatively coupled to the processor, the computer readable medium having instructions executable by the processor to perform a method comprising:
       performing a sub-channel fast Fourier transform (FFT) on the digital signal;

averaging sub-channel FFT bin magnitudes over a set period of time to determine a shape of the received signal; and comparing the shape of the received signal to one or more signal reference patterns by a method comprising:

(a) normalizing the shape of the received signal;
(b) selecting a next signal reference pattern;
(c) normalizing the next signal reference pattern;
(d) computing a bias correction factor for the normalized received signal and the normalized signal reference pattern;
(e) computing a metric for comparing the shape of the normalized received signal with the normalized signal reference pattern;
(f) determining whether one or more different signal reference patterns are available;
(g) if one or more different signal reference patterns are available, repeating (b) to (f) until a metric has been computed for each of the signal reference patterns; and
(h) determining whether each computed metric has passed a threshold requirement indicating that a signal of interest is present in the received signal.

15. The system of claim 14, wherein averaging the sub-channel FFT bin magnitudes comprises computing sub-channel FFT bin magnitudes by summing the magnitudes of the bins within a channel.

16. The system of claim 14, wherein averaging the sub-channel FFT bin magnitudes comprises:

(a) performing an M-point FFT, where M is a variable representing the number of data points that provide sufficient resolution to provide multiple FFT bins per channel for a data block;
(b) updating a rejection threshold;
(c) determining whether a channel magnitude is greater than the threshold;
(d) if the channel magnitude is not greater than the threshold, adding current sub-channel FFT bin magnitudes to a sum of past sub-channel FFT bin magnitudes for a current sample collection period and determining whether the sample collection period is complete;
(e) if the channel magnitude is greater than the threshold, determining whether the current sample collection period is complete; and
(f) repeating (a) to (e) if the sample collection period is not complete.

17. The system of claim 14, wherein when the radio front end is configured to receive multiple channels, prior to performing a sub-channel FFT on the digital signal, an FFT or filtering is performed on the sampled data to channelize the signal.

18. The system of claim 17, wherein the sub-channel FFT is performed on the channelized signal, and a magnitude of the channelized signal is computed.

* * * * *